Jan. 19, 1926. 1,570,446
L. MOMBARUZZO
THERMOSTATIC CONTROL
Filed August 4, 1924    2 Sheets-Sheet 2

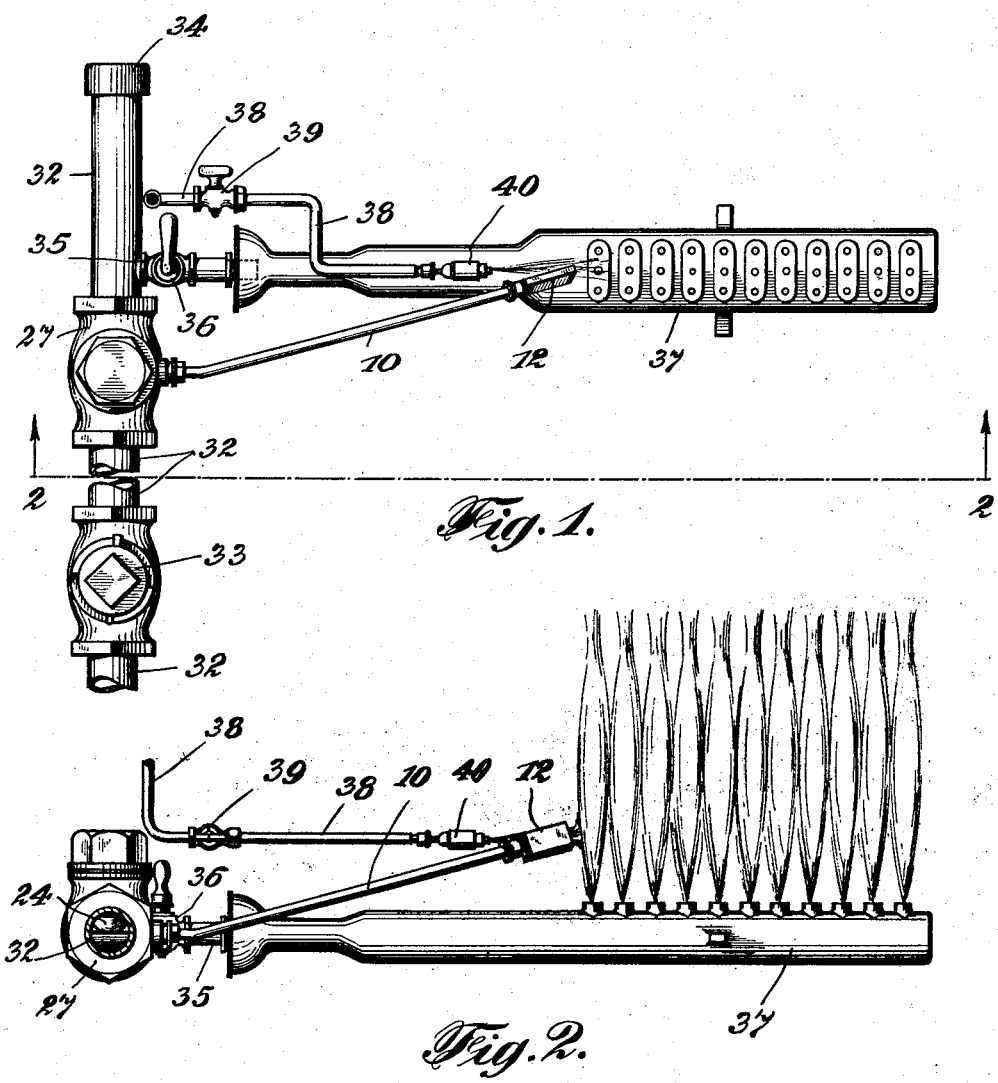

INVENTOR
Luigi Mombaruzzo
BY
his ATTORNEY

Patented Jan. 19, 1926.

1,570,446

UNITED STATES PATENT OFFICE.

LUIGI MOMBARUZZO, OF NEW YORK, N. Y.

THERMOSTATIC CONTROL.

Application filed August 4, 1924. Serial No. 729,936.

*To all whom it may concern:*

Be it known that I, LUIGI MOMBARUZZO, a citizen of Italy, residing at New York city, county of New York, borough of Manhattan, and State of New York, have invented new and useful Improvements in Thermostatic Control, of which the following is a full, clear, and exact specification.

My invention relates to thermostatic control and refers particularly to the thermostatic control of valves with special reference to gas heating devices.

My invention consists of means and devices for thermostatically controlling valves and, while they are adapted for wide application, they are particularly suitable in conjunction with gas heaters as a means for safe-guarding against the possibility of leakage or unlighted gas with the consequent danger of explosion.

Gas heating devices of the generally adopted characters include means for automatically controlling the supply of gas to the heating units in order that a uniform temperature may be obtained.

In devices of this class, the gas supply is at times reduced to an extremely small amount, or entirely cut off. This curtailment of the gas supply frequently results in the accidental extinguishment of the flame. If the gas supply be removed, it is evident that failure of ignition will result in an accumulation of unlighted gas, which is extremely liable to explode when a light is brought into contact therewith.

To overcome this ever present danger resource is made to so-called pilot lights, that is, lights which are supplied from an independent source of gas and which are kept continually lighted. For the sake of economy, the flames of these pilot lights are extremely small, and hence, are liable to become extinguished. If now the main heater gas supply be renewed, there is no light to ignite it and the danger of gas accumulation occurs.

It is evident, therefore, that the safety of gas heaters of this class is absolutely dependent upon the constant ignition of the pilot light gas, or of the absolute impossibility of supplying gas to the heater unit when the pilot light is extinguished.

It is evident that there can be no absolute guarantee of the constant ignition of the pilot light and that, hence, the only actual and always operative means for preventing the danger of gas accumulation is one that will make it impossible for gas to be supplied to the heating unit during the nonignition of the pilot light gas.

My invention accomplishes this desirable and valuable result in an effective automatic manner and requires no attention of the operator for its application.

While I have described my invention as applied to gas heating devices, it is evident that it has many valuable applications.

In the accompanying drawings, illustrating one form of the device of my invention, similar parts are designated by similar numerals.

Figure 1 is a top plan view of one form of my invention.

Figure 2 is a view through the line 2—2 of Figure 1.

Figure 3:
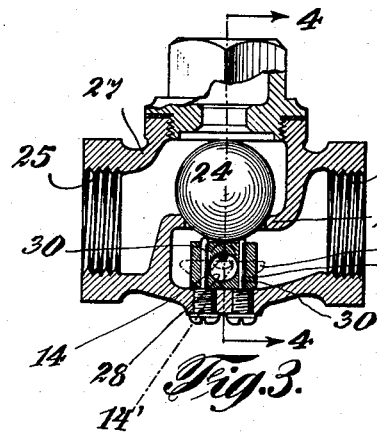
Figure 3 is a vertical cross-section of a ball valve operated thermostatically.
Figure 4:
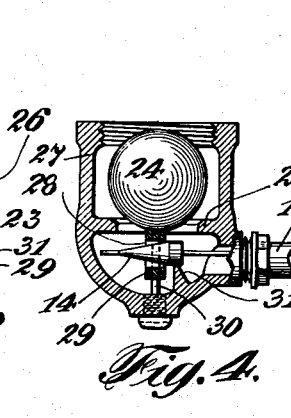
Figure 4 is a cross-section through the line 4—4 of Figure 3.
Figure 5:
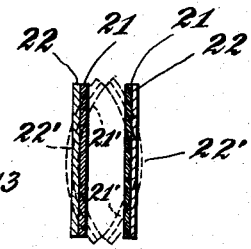
Figure 5 is an end view of two of my thermostatic leaves, the broken lines indicating their positions under the influence of heat.
Figure 6:
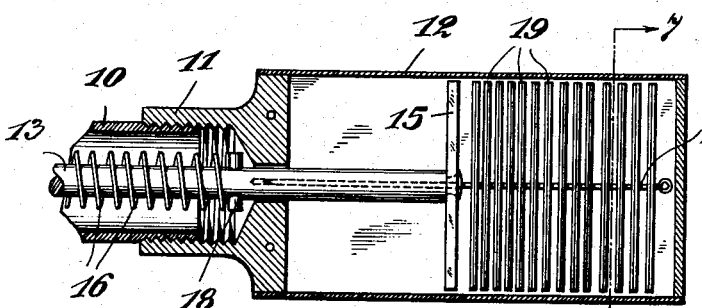
Figure 6 is a vertical cross-section of my thermostatic container and thermostatic leaves when not heated.
Figure 7:
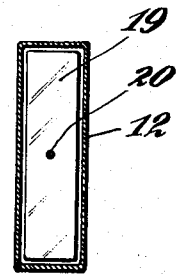
Figure 7 is a cross-section through the line 7—7 of Figure 6.
Figure 8:
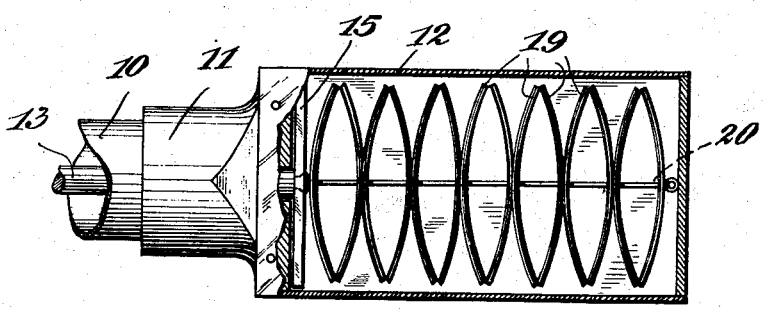
Figure 8 is a view corresponding to Figure 6 when heated.
Figure 9:
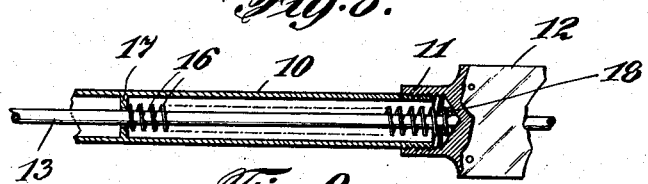
Figure 9 is a vertical cross-section of the thermostatically controlled rod and the means for returning it to normal position.

The particular form of thermostatic control of my invention, shown in the accompanying drawings in conjunction with my heating system, comprises a tubular member 10, one end of which is externally threaded to receive the internally threaded end 11 of the container 12. A rod 13 extends through and is longitudinally movable within the tubular member 10. One end of the rod 13 carries the conical member 14 and the other end carries the revoluble plate 15. A spiral spring 16 within the tube 10 has its one end anchored to the flange 17, fixedly attached to the tube 10 and its other end fixedly attached to the flange 18 carried by the rod 13. The normal tendency is to force the rod 13 into the container, or chamber, 12. The container 12 contains a plurality of thermostatic plates 19, 19, a rod 20 passing through holes in said plates and into a recess within the rod 13. Each thermostatic plate 19 is composed of two plates, or layers, of metals of different coefficients of expansion fixedly attached to each other, as shown in Figure 5. I prefer to use steel 21 and brass 22 for this purpose, although other metals may be employed. When these plates are positioned with similar faces towards each other, they will expand under the influence of heat, as shown in Figures 5 and 8.

The particular means shown in the drawings whereby the expansion of the thermostatic plates 19, 19 and the consequent movement of the rod 13 may be utilized as a valve operating means comprising a ball valve 27 having the valve seat 23, the ball 24, the entrance opening 25 and the exit opening 26. The conical member 14 of the rod 13 is slidable through an opening 28 in the vertically movable member, or valve-raising member 29 which is movable along the guide rods 30, 30.

The conical member 14 also rests upon the projection 31.

The operation of the described thermostat is as follows:—

When the device is at normal temperature, the several members are so positioned that the conical member 14 is withdrawn from the valve 27 so as to allow the ball 24 to be seated upon the valve seat 23 thus preventing the passage of gas therethrough. The application of heat to the casing 10 is transmitted to the thermostatic plates 19, 19, causing them to expand, moving the rod 13 toward the valve 27, the cone 14 passing over the projection 31 while, at the same time, the cone 14 is forced through the opening 28 of the valve-raising member 29, causing the latter to rise, thus forcing the ball 24 upwardly from its seat 23, allowing gas to pass through the valve 27. When the application of heat is removed from the container 10, the thermostatic plates 19, 19 assume their normal shape, the spring 16 forces the rod 13 into the container 12, thus drawing it outwardly from the valve 27, allowing the ball 24 to seat upon the seat 23 and closing the valve, preventing further passage of gas therethrough.

The particular arrangement of my thermostatic control in conjunction with other elements to produce a safety heating system is shown in Figures 1 and 2, which are directed to a gas heating device.

A pipe 32, connected with a source of gas supply, carries the valves 33 and 27 and is closed at one end by means of the cap 34. The pipe 32 beyond the valve 27 connects with a pipe 35 carrying the valve 36. The pipe 35 leads to an ordinary gas heater burner 37. A pipe 38, connected with a source of gas supply carries the valve 39 and the gas burner 40, which serves as a pilot light and which is directed upon the thermostatic container 12. The gas burner may be a thermostatically controlled one which closes off the source of gas supply when the pilot light is extinguished, and I prefer this form of burner for reasons which will be explained later.

The operations of my system and my device are as follows:—

To commence the gas-heating operation, the valve 39 is opened and the pilot burner 40 lighted. The valve 33 is then opened. The gas can not pass through the valve 27 until the heat of the pilot light 40 causes the thermostatic elements to open the valve 27. It is evident that there can be no passage of the gas into the heater 37 until the pilot light 40 is lighted, thus insuring against the escape of unlighted gas into the heater. The valve 33, 36 and 39 may, of course, be set to supply the proper amount of gas for the desired conditions, and the valve 33 may be thermostatically controlled by any suitable means to regulate the amount of gas consumed by the heater 37 and the consequent heat produced thereby.

If, for any reason, the heater flames are extinguished and the gas again caused to pass through the pipe 35, the pilot light 40 will ignite it, thus preventing the accumulation of unlighted gas.

If, during the extinguishment of the heater gas, the pilot gas should be accidentally extinguished, the thermostatic control will close the valve 27, thus preventing gas from entering the heater 37 and the thermostatically controlled gas burner 40 would close, thus preventing gas from entering the device through the pipe 38.

It will be seen from the above that the extinguishment of the pilot light will automatically cut off the gas supply to the heater, thus preventing an accumulation of unlighted gas within the heating device and acting as a warning that the system is not in safe operating condition.

My invention does not prevent, or interfere with, any desired system, or devices, for the control of the amount of gas introduced into the heater for the purpose of regulating the amount of heat generated thereby, but is an auxiliary thereto for the prevention of accidental accumulation of gas within the device due to the extinguishment of either the heater gas or the pilot light.

I do not limit myself to the particular size, shape, number or arrangement of parts, as shown and described, as these are given simply as a means for clearly explaining my invention.

What I claim is:

In a thermostatic control, in combination, a container, a plurality of movable thermostatic plates within the container so positioned that they will expand in arc formation against each other when heated, a tube connecting a valve with the container, a ball valve, a rod longitudinally movable within the tube, means carried by the rod abuttable upon a thermostatic plate, a conical member carried by the rod and insertable beneath a ball closure of the valve, means whereby the expansion of the thermostatic plates will cause the conical member to move beneath the ball raising it from its seat, and means whereby the return of the plates to normal temperature will cause the removal of the conical member from beneath the ball allowing the ball to be positioned upon its seat.

Signed at New York city in the county of New York and State of New York this 30th day of July, 1924.

LUIGI MOMBARUZZO.